United States Patent [19]

Masuda et al.

[11] 4,093,240

[45] June 6, 1978

[54] PLUNGER SEALING AND LUBRICATING APPARATUS FOR PUMPS

[75] Inventors: Taiji Masuda; Hitoshi Mizuno, both of Odawara, Japan

[73] Assignee: Kabushiki Kaisha Shikutani, Odawara, Japan

[21] Appl. No.: 806,701

[22] Filed: Jun. 15, 1977

[51] Int. Cl.² .................. B65D 53/00; F04B 39/02
[52] U.S. Cl. .................... 277/15; 277/59; 92/153; 92/168; 417/366; 417/568
[58] Field of Search ............... 417/366, 568; 92/153, 92/168; 277/12, 15, 17–19, 22, 59

[56] References Cited

U.S. PATENT DOCUMENTS

| 2,591,902 | 4/1952 | Yohpe | 417/568 X |
| 3,540,741 | 11/1970 | LeFebvre | 92/168 X |
| 3,943,717 | 3/1976 | Schexnayder | 277/19 X |

FOREIGN PATENT DOCUMENTS

| 834,998 | 5/1960 | United Kingdom | 277/59 |
| 905,650 | 9/1962 | United Kingdom | 277/15 |

*Primary Examiner*—Robert S. Ward, Jr.
*Attorney, Agent, or Firm*—Birch, Stewart, Kolasch & Birch

[57] ABSTRACT

Plunger sealing and lubricating apparatus for horizontal plunger pumps including a front sealing packing and the front half of a back sealing packing lubricated with water which is provided from the suction chamber and leaks from the front sealing packing. The back half of the back sealing being lubricated with oil provided by the oiling packing behind the back sealing packing. The back sealing packing acts as a water-tight barrier and makes such a wide frictional contact with the plunger to prevent water from leaking. Thus, resulting in the return of water to the suction chamber from a space between the front and back sealing packings through a passage connecting the space with the suction chamber. By the use of the apparatus, a secondary liquid line can be introduced to the suction side of the pump to which the main liquid line is connected.

7 Claims, 3 Drawing Figures

4,093,240

PLUNGER SEALING AND LUBRICATING APPARATUS FOR PUMPS

BACKGROUND AND SUMMARY OF THE INVENTION

The present invention relates to plunger sealing and lubricating apparatus for horizontal plunger pumps for use in power sprayers or the like, and more particularly to plunger sealing and lubricating apparatus of the type having a liquid passage extending from a void space between the front and back sealing packings to the suction chamber.

The plunger pump is usually required to have sealing packings replaced when liquid leaks substantially out of the pump body. Otherwise the leaking liquid will stain the casing of the pump. If the liquid is odorous or toxic, additional problems are created.

An apparatus for plunger pumps is in the prior art that comprises front and back sealing packings, a grease packing disposed therebetween, and a liquid passage extending from a space between the front and grease packings to the suction chamber, whereby liquid leaking from the front packing returns to the suction chamber through the passage.

The apparatus as described above has disadvantages in that the grease is dispersed to enter the suction chamber together with liquid. Another disadvantage is that the back sealing packing as a final barrier has the backward portion insufficiently lubricated with the result that it wears and leaks develop soon through use.

Pursuant to the present invention, there is provided a plunger sealing and lubricating apparatus for horizontal plunger pumps, which comprises a packing room provided for each plunger in the rear portion of the cylinder block. The room including forward and rearward portions and an annular groove therebetween, a packing retainer having the front portion thereof threadedly fitted in the rearward portion of the room and the back portion thereof projecting backwardly from the room, a front sealing packing disposed in the forward portion of the room, a back sealing packing disposed in the back portion of the retainer and having the front side adjacent an inner annular shoulder formed between the front and back portions of the retainer. Further an oiling is positioned behind the back sealing packing in the back portion of the retainer, the oiling packing having a leg drawn down out of the retainer and immersed in oil in an oil-pan secured to the cylinder block, the retainer has a plurality of holes formed in the front portion for internal communication between the annular groove in the room and a space defined by the front and back sealing packings inside the retainer. In addition a passage is provided for internal communication between the annular groove and the suction chamber in the cylinder head, and a conduit disposed in the passage between the cylinder block and the cylinder head. The plunger reciprocates horizontally through the front and back sealing and the oiling packings. The back sealing packing has such a wide frictional surface about the plunger to prevent the leaking of liquid.

For this arrangement, the front sealing packing as well as the front half of the back sealing packing are sufficiently lubricated with liquid coming from the suction chamber and leaking from the front sealing packing. The back half of the back sealing packing is well lubricated with oil provided by the oiling packing behind the back sealing packing. Oil is so separated from liquid as to be prevented from entering the suction chamber together with the liquid. Liquid is prevented from leaking out of the pump body by the wide surface about the plunger of the back sealing packing, thereby returning from the space between the front and back sealing packings to the suction chamber through the passage in the low pressure side. Therefore, the packings can be used for a long time without a leakage problem.

A preferred embodiment of the invention is provided in a pump having a plurality of plungers. The forward portion of the room is smaller in diameter than the rearward portion. The adjacent grooves are connected to each other through the respective channel formed in the cylinder block. An additional inlet port with a removable plug is provided in the upper side of the cylinder and extends from the upper surface of the cylinder block to one of the channels. Thus, if necessary, a secondary liquid line can be introduced through the additional port to the suction side of the pump to which liquid is supplied from the main liquid line.

In one convenient embodiment of the invention, the back sealing packing has a T-shaped cross section to make a wide frictional contact with the plunger. The oiling packing is formed in the shape of a key-hole with the leg drawn outwardly through one of the slits in the under side of the retainer.

In general, it is a fact that the pump of the present invention provides improvements in pumping performance due to liquid lubrication as liquid leaks from the sealing packing. This suggests that the inventive sealing and lubricating apparatus can increase pumping performance.

From the foregoing, it is an object of the present invention to provide an improved plunger sealing and lubricating apparatus for horizontal plunger pumps, in which the packings can be used for a long time without a leakage problem.

It is another object of the invention to provide an improved plunger sealing and lubricating apparatus for horizontal plunger pumps, which can produce improvements in pumping performance.

It is still another object of the invention to provide an improved sealing and lubricating apparatus for horizontal plunger pumps, in which a secondary liquid line can be connected to the main liquid line.

The above and other objects and features of the invention will appear more fully hereinafter from a consideration of the following description taken in connection with the accompanying drawings wherein one example is illustrated by way of example.

DETAILED DESCRIPTION OF THE PREFERRED EMBODIMENT

Figure 1:
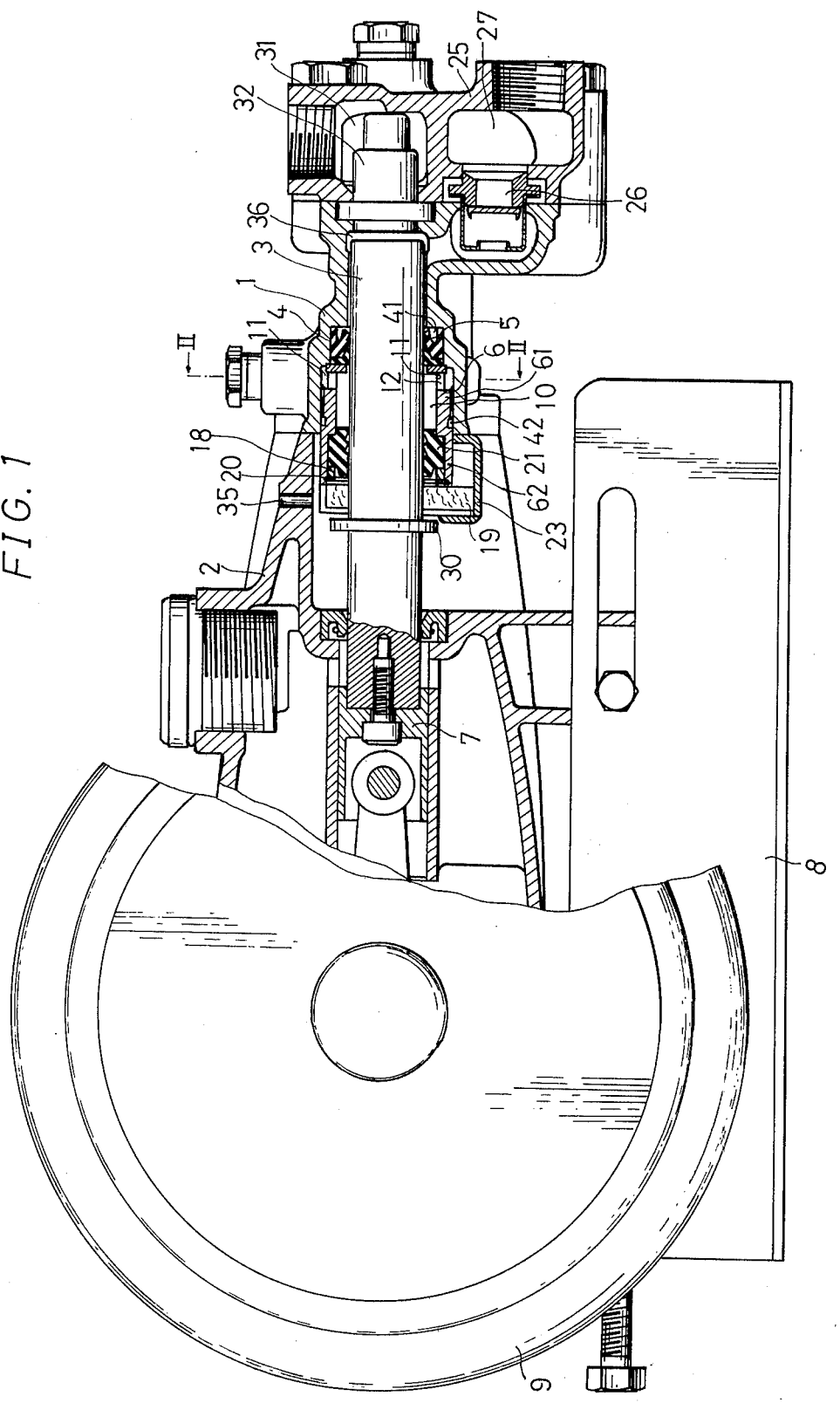
FIG. 1 is a side elevational view, partly in section, of the horizontal plunger pump provided with the apparatus of the invention.
Figure 2:
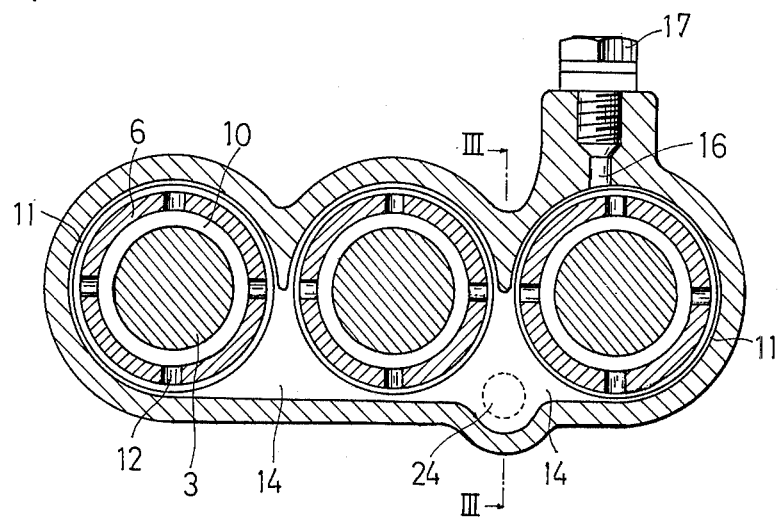
FIG. 2 is a somewhat enlarged sectional view taken along the line II—II in FIG. 1.

As is shown in FIG. 1, the horizontal plunger pump for use in power sprayers has a cylinder block 1 secured to a crank case 2 which is fixedly mounted on a base 8. Three plungers 3, illustrated in FIG. 2, are disposed horizontally in parallel and slidably in the cylinder block 1 and crank case 2. Each plunger 3 has its rear end threadedly fixed to the respective piston head 7 of a crank system in the crank case 2. A pulley 9 connected to the crank system is rotated by a prime mover such as an electric motor or gasoline engine (not shown), so that the crank system is caused to including the piston head 7 as well as the plunger 3.

The cylinder block 1 is formed with three hollow cylindrical rooms 4 each coaxially surrounding the respective plunger 3. The room 4 has forward and rearward portions 41 and 42 and an annular groove 11 formed therebetween, the forward portion 41 smaller in diameter than the rearward portion 42. A front sealing packing 5 is disposed in the forward portion 41 and pushed by the front of a hollow cylindrical retainer 6. The retainer 6 has front and back portions 61 and 62 coaxially surrounding the respective plunger 3, the front portion 61 being smaller in diameter than the back portion 62. The front portion 61 has the outer periphery threaded for fitting engagement with the threaded inner periphery of the rearward portion 42 of the room 4 and the back portion 62 projects rearwardly from the room 4 of the cylinder block 1.

A back sealing packing 21 is disposed coaxially in the back portion 62 to make a tight contact with an inner annular shoulder formed between the front and back portions 61 and 62. The back sealing packing 21 is T-shaped in cross section with the narrow outer section backed up by a collar 18 which is fitted in the back portion 62 by the help of a snap ring 20. An oiling packing 19 in the form of a key-hole is disposed behind the back sealing packing 21. The leg of the oiling packing 19 is drawn down outwardly through one of the slits in the under side of the retainer 6 and immersed in oil in an oil-pan 23 secured to the cylinder block. Oil is supplied to the oil-pan 23 through a bore 35 provided in the crank case 2.

The retainer 6 has a plurality of holes 12 formed near the front end in the front portion 61 for internal communication between a void space 10 defined by the front and back sealing packings 5 and 21 inside the front portion 61 and the annular groove 11 in the room 4. There is a drain ring 30 mounted on the plunger 3 behind the oiling packing 19.

A cylinder head 25 is fixed to the front of the cylinder block 1 and formed with suction and exhaust chambers 27 and 31. The suction and exhaust chambers 27 and 31 are internally connected to a pumping space 36 through suction and exhaust valves 26 and 32, respectively. The front and back packings 5 and 21 have their center openings closely fitted on the plunger 3 for sealing and sliding engagement therewith. On the other hand, the oiling packing 19 has its center opening loosely fitted on the plunger 3 for oiling engagement therewith.

Figure 3:
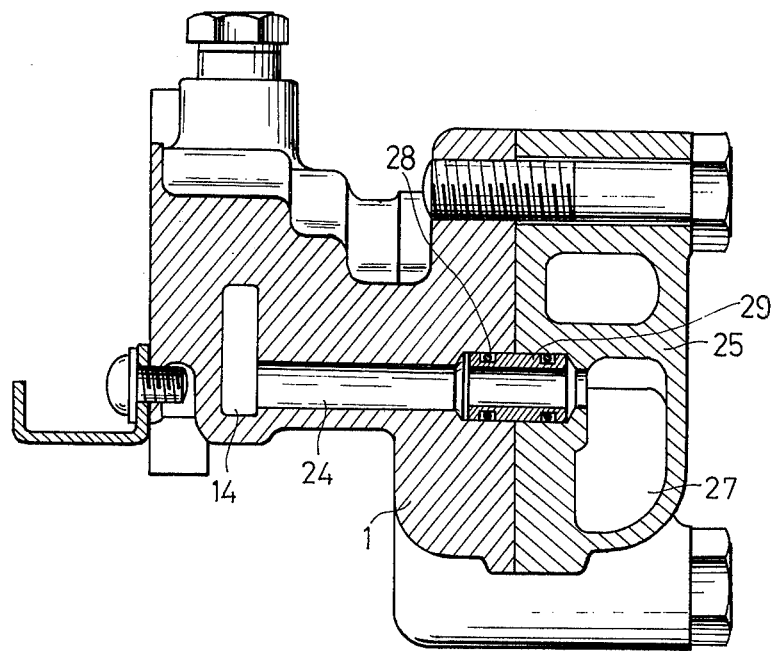
FIG. 3 is a somewhat enlarged view in section passing through the line III—III in FIG. 2.

As is shown in FIGS. 2 and 3, the cylinder block 1 has two channels 14 formed between the adjacent annular grooves 11 for communication therebetween. An additional inlet port 16 with a removable plug 17 is provided in the cylinder block, extending from the upper surface of the cylinder block 1 to one of the channels 14. There is provided a horizontal passage 24 extending from the suction chamber 27 in the cylinder head 25 to one of the channels 14 in the cylinder block 1 through a conduit 29 disposed as a bridge between the cylinder head 25 and the cylinder block 1. The conduit 29 is equipped with both sealing packings 28 adjacent its opposite ends. It will be understood that in the low pressure side is a water circuit composed of void space 10, holes 12, annular groove 11, channel 14, additional inlet port 16 and horizontal passage 24 inclusive of conduit 29.

The operation of the plunger pump as described above will now be explained. Upon starting of the prime mover, the crank system is driven to reciprocate the piston head 7 together with the plunger 3 through the front and back sealing packings 5 and 21 and oiling packing 19. Water enters the void space 10 from the suction chamber 27 through conduit 29, horizontal passage 24, channel 14, annular groove 11, and holes 12, so that the front sealing packing 5 and the front half of the back sealing packing 21 have their frictional surfaces over the plunger 3 well lubricated with water at all times. Water leaking from the front packing 5 lubricates the front sealing packing 5 also and the front half of the back sealing packing 21. On the other hand, the back sealing packing 21 has the back half lubricated sufficiently with oil provided by the oiling packing 19 disposed therebehind. Although the back sealing packing 21 has a wide frictional surface on the plunger 3, it is well lubricated in front as well as in rear both with water and with oil, resulting in an endurable packing. Oil is arranged to lubricate the back packing 19 separately from water and not to enter the suction chamber together with water. It will be understood that oil lubrication is simple in maintenance in comparison with grease lubrication.

The back sealing packing 21 as a water-tight barrier has such a wide frictional surface about the plunger 3 such that water is prevented from leaking therefrom. The water returns from the space 10 to the suction chamber 27 through holes 12, annular groove 11, channel 14, horizontal passage 24 and conduit 29, in turns, which are all in the low pressure side.

Upon removal of the plug 17, a secondary liquid line, for example chemicals, can be connected to the additional inlet port 16 from which it will be introduced to the suction chamber 27 through channel 14, horizontal passage 24, and conduit 29 in the low pressure side. Thus, chemicals supplied from the secondary line can easily be mixed and pumped with water supplied from the main liquid line.

It should be understood that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. Plunger sealing and lubricating apparatus for horizontal plunger pumps provided with a crank case mounted on a base, a cylinder block fixed to the crank case, a cylinder head secured to the front of the cylinder block, and at least a plunger horizontally slidably disposed in the cylinder block, which comprises a hollow cylindrical room formed coaxially with each plunger in the cylinder block, said room having forward and rearward portions and an annular groove therebetween, a hollow cylindrical retainer having the front portion thereof threadedly fitted in the rearward portion of said room and the back portion projecting backwardly from said room, the front portion of said retainer being in diameter smaller than the back portion and forming an inner annular shoulder therebetween, a first sealing packing mounted in the forward portion of said room in front of said retainer, a second sealing packing mounted in the back portion of said retainer and having the front side pressed against said shoulder, an oiling packing mounted behind said second sealing packing in the back portion of said retainer and having a leg portion drawn down out of said retainer and immersed in oil in an oil-pan secured to the cylinder block, said retainer having a plurality of holes formed in the front portion for internal communication between a void space defined by said first and second sealing packings and said annular groove in said room, a liquid passage internally provided for communication between said groove in the cylinder block and a suction chamber in the cylinder head, a sealed conduit disposed in said liquid passage and bridging the joining between the cylinder block and the cylinder head.

2. Apparatus according to claim 1, wherein the cylinder block has at least a channel formed between adjacent annular grooves for internal communication therebetween.

3. Apparatus according to claim 2, wherein the cylinder block is provided with an additional inlet port having a removable plug, said port extending vertically from the upper side of the cylinder block to one of said channels.

4. Apparatus according to claim 3, wherein said liquid passage horizontally extends from one of said channels to said suction chamber in the cylinder head.

5. Apparatus according to claim 4, wherein the forward portion of said room is smaller in diameter than the rearward portion thereof.

6. Apparatus according to claim 1, wherein said second sealing packing has such a wide frictional surface on the plunger that liquid is prevented from leaking therefrom.

7. Apparatus according to claim 6, wherein said second sealing packing has a T-shaped cross section and said oiling packing is key-hole-shaped.

* * * * *